3,127,439
HALF ALKYL-HALF AMIDES OF MALEIC ACID
Leslie L. Sims, Baton Rouge, La., assignor to Ethyl Corporation, New York, N.Y., a corporation of Virginia
No Drawing. Filed Apr. 27, 1962, Ser. No. 190,811
3 Claims. (Cl. 260—482)

The present invention relates to novel hard waxes yielding films with a high surface gloss.

Carnauba wax, as outlined by Warth in "The Chemistry and Technology of Waxes" 2nd edition (1960) Reinhold Publishing Company, New York, is recognized as the most superior wax in the art, and is very expensive. Carnauba wax is obtained from the leaves of a species of an American genus of palm designated as the *Copernicia cerifera*. The mature leaves of the palm are cut from the tree and sun-dried during which the wax is loosened from the leaves. The leaves are ripped apart by hand and beaten to remove the wax dust which is then recovered from the floor. The average leaf of the palm yields only about 5 grams of wax. The average tree gives a maximum of about 20 leaves a year. Thus, five palms give about one pound of wax per year. This small yield of wax necessitates having about 50,000,000 trees in production. The average yields and quality of this wax, like other agricultural crops, are also directly affected by the weather during the growing year. Thus it is seen that carnauba wax is not too plentiful and is expensive to produce and is of variable quality.

In the past, many attempts have been made to produce new waxes and additives for various waxes so as to approximate the beneficial properties of carnauba wax by means of cheaper and more abundant materials. One such attempt has been to esterify a mixture of montanic acids with polyhydric alcohols to obtain products which are somewhat superior to montanic acids as waxes. Still another attempt has been to convert free acid groups of products obtained by partial esterification of montanic acids with polyhydric alcohols largely into salts by reacting them with substances forming wax soaps and thus to obtain waxes which are distinguished by very good oil binding properties and yielding paste, leaving behind a glossy wax film. The products obtained by this method are soft.

It has also been known in the past to produce ester waxes by reacting aliphatic acids having more than 18 carbon atoms, such as acids contained in montan wax, with aromatic methylols. These acids are first bleached by oxidation and then reacted with the aromatic dimethylol. It has been taught in U.S. Patent 2,963,379, that the reaction product of aliphatic acids having more than 18 carbon atoms with aliphatic alcohols will not produce waxes with a high surface gloss and hardness in the carnauba wax range.

U.S. Patent 2,877,123 has described proportionately mixed saturated straight chain and saturated branched chain dibasic acid esters each ester containing a total of 16 to 64 carbon atoms. Typical of the esters described therein are the dimethyl ester of octadecadiene-7,11-dicarboxylic acid-1,18; dimethyl ester of 7-vinyl-hexadecene-9-dicarboxylic acid-1,16; dimethyl ester of the $C_{20}$-diethylenic dicarboxylic acids, and the like. These products are described as soft, semi-solids at room temperature and therefore do not have the desirable properties of the hard carnauba wax.

It is therefore an object of the present invention to provide a new relatively inexpensive wax which can be readily synthesized from available raw materials and which has desirable properties approximating those of carnauba wax. It is a further object of the present invention to produce novel half ester-half amides which when applied to a surface leave a hard, glossy film. Other objects will appear more fully hereinafter.

It has now been found that hard waxes yielding films of high gloss are obtained by the provision of compositions consisting essentially of an alkyl ester of maleamic acid wherein the alkyl group generally contains from about 18 to about 36 carbon atoms. It is preferable, however, that the alkyl group contain from about 18 to about 26 carbon atoms since the compositions within this range exhibit excellent properties very similar to carnauba wax. Typical of the ester groups are octadecyl, nonadecyl, eicosanyl, heneicosanyl, docosanyl, tricosanyl, tetracosanyl, pentacosanyl, hexacosanyl, and the like.

The alcohols which are reacted with the dicarboxylic acids to form the half ester-half amide of this invention are alcohols having from about 18 to about 36 carbon atoms. The most preferred alcohols are those having from about 18 to about 26 carbon atoms since the half ester-half amides produced from this preferred range of alcohols are more economical and exhibit properties of the most preferred waxes produced from natural sources. Usable waxes are produced from branched chain alkanols in the foregoing molecular weight ranges. The most particularly preferred alcohols are those having an even number of carbon atoms since these alcohols are more readily obtained and more economical. However, the alcohols employed in this invention are preferably essentially straight chain saturated aliphatic alcohols having up to about 20 weight percent of beta branched alcohols present. Generally, the beta branched alcohols present in the alcohol reactant have the formula

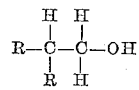

wherein R and R' are substantially straight chain alkyl groups having a total of from about 16 to about 34 carbon atoms. Most preferably, aliphatic alcohols having branched alcohol contents ranging on a weight basis from about 0 percent up to about 10 percent are employed. While not desiring to be bound by theoretical considerations it is believed that the extremely low beta branched alcohol content in the alcohol reactant of this invention imparts to the half ester-half amide product superior qualities of hardness and luster.

Typical examples of the alcohols which may be employed in the process of this invention are n-octadecanol, n-nonadecanol, n-eicosanol, n-heneicosanol, n-docosanol, n-tricosanol, n-tetracosanol, n-pentacosanol, n-hexacosanol, n-heptacosanol, n-octacosanol, n-nonacosanol, n-triacontanol, n-hentriacontanol, n-dotriacontanol, n-tetratriacontanol, n-pentatriacontanol, and n-hexatriacontanol.

Typical of the beta branched alcohols present in the alcohol reactant are beta-ethyl hexadecanol, beta-butyl hexadecanol, beta-hexyl eicosanol, beta-ethyl eicosanol, beta-ethyl docosanol, beta-hexyl hexacosanol, and the like.

Typical examples of the mixtures of straight chain alcohols containing beta branched alcohols are 10 percent beta-ethyl eicosanol-90 percent n-docosanol; 20 percent beta-ethyl hexadecanol-80 percent n-octadecanol; 5 percent beta-hexyl octadecanol-95 percent n-tetracosanol, and the like.

These long chain primary alcohols are conveniently produced from alpha-olefins by any of a number of techniques. For example, long chain alpha-olefins (i.e. $C_{18}$ to $C_{36}$ alpha-olefins) may be treated with an acid in the presence of a peroxide to obtain an anti-Markownikoff addition product. A typical example of this is the reaction of the desired alpha-olefin with hydrogen bromide in the presence of a peroxide to obtain an alkyl bromide which can be converted to the primary alcohol by hydrolysis Still another technique of obtaining the desired alcohols is by hydroboration. A typical example of a hydroboration reaction is the addition of sodium borohydride and boron trifluoride diethyl etherate complex in a solvent such as the dimethyl ether of diethylene glycol. To this mixture is added the alpha-olefin which reacts with the diborane, which was formed in situ, to produce the hydroborated olefin. The hydroborated olefin is then treated with sodium hydroxide and hydrogen peroxide to obtain the primary alcohol. The hydroboration process is essentially set forth in the "Journal of Organic Chemistry," September 1957, pages 1136 and 1137.

The higher alpha-olefins, having low branched olefin content, which are used to produce the most desired primary alcohols are obtained by reacting ethylene in the presence of a trialkylaluminum catalyst at a temperature of about 140° C. to 225° C. and a pressure of about 700 p.s.i. The process of producing these alpha-olefins having low vinyldene content is set forth in copending application Serial No. 59,190, filed September 29, 1960.

The advantages of the novel compositions of this invention are many in number. As stated hereinbefore, these novel half ester-half amides have a hardness within the carnauba wax range. These half amides also exhibit excellent luster when applied to a surface to be waxed. The half esters are also capable of being emulsified. Raw waxes, such as carnauba, obtained from natural sources are expensive and require purification and bleaching. In contrast, the half ester-half amides of this invention involve but a fraction of the cost of the natural carnauba waxes and require no costly bleaching and purification process, the half ester products being white solids. Furthermore, many natural waxes have an odor which must be disguised by the addition of an additive to lessen its odoriferous properties. Unlike these natural products, the half ester-half amides of the present invention have no odor, or at least no offensive odor. Still other advantages will be seen from the ensuing description.

The novel half ester-half amides of maleic acid can be produced by many processes. One typical method comprises reacting maleic anhydride with the desired alkanol at temperatures ranging from about 90° C. up to about 230° C. in the presence or absence of any of the recognized solvents which are inert to the reactants and the reaction products. Generally, the alcohol reactant forms the solvent for the system. On occasion, where desired, a catalyst such as a mineral acid may be employed. It is preferred, however, to omit the use of a catalyst. The alcohol employed is generally present in about stoichiometric amounts such that the half ester is produced.

The half ester-half acid so produced is thereafter converted to the acid halide by reacting said half ester with a halogen-containing compound such as thionyl chloride or thionyl bromide at the reflux temperature of the system for a period of time ranging up to about four hours. The half ester acid halide product is thereafter mixed with a solvent such as benzene and heated to the reflux temperature of the system while ammonia gas is passed through the reaction mass. The desired product obtained is the half ester-half amide of maleic acid.

Another typical method of producing the novel half ester-half amide is by reacting the half ester of the dibasic acid directly with ammonia at temperatures ranging from about 25° C. up to about 150° C. at a pressure ranging from about atmospheric up to about 10 atmospheres. The product thus obtained is the ammonium salt of the acid ester. The ammonium salt of the acid ester is thereafter heated to a temperature ranging from about 50° C. to about 270° C. in the presence of a compound which takes up water such as $P_2O_5$, calcium oxide, or in some instances, carbon dioxide. The product thus obtained is the half ester-half amide.

Still another typical method of producing the novel products of this invention is by reacting maleimide with the desired alcohol at temperatures ranging from about 50° C. up to about 250° C. for a period of time ranging up to about six hours. The product obtained from this reaction is the novel half ester-half amide.

These novel half ester-half amides and the process by which they are produced will be further understood from the following examples in which all parts are by weight unless otherwise specified.

EXAMPLE I

Maleic anhydride (39.2 parts) was mixed with 130.4 parts of docosanol. The mixture was stirred and heated to 130° C. for five hours after which the half ester monodocosanyl maleic acid was recovered. The monoester was thereafter recrystallized from toluene. The recrystallized monodocosanyl maleic acid was refluxed for two hours with 163 parts by volume of thionyl chloride. The excess thionyl chloride was removed under reduced pressure. The resultant product, docosanyl maleyl chloride was mxed with 100 ml. of essentially anhydrous benzene and was heated to the reflux temperature of the system while ammonia gas was passed through the reaction mass for about three hours. The reaction mass was cooled and solid precipitate docosanyl maleamide was recovered. The product docosanyl maleamide was recrystallized from toluene and the melting point was found to be from 105° to 108° C. The product was subjected to a penetrometer test which gave a reading of 2. The penetrometer reading is a measure of insertion of a needle in the bulk of the wax specimen using a standard weight at a standard temperature for a standard time. Therefore, the lower the number the harder the wax. The penetrometer readings were taken under standard conditions which are 5 seconds at 25° C. with 100 gram weight. This measurement was in conformance to ASTM test No. D1168–51T.

EXAMPLE II

To 9.6 parts of maleimide is added 27 parts of octadecanol. The reactants are heated to 100° C. for five hours while stirring. The reaction mass is cooled and the solid product, monooctadecyl maleamide is recovered.

When either of the procedures of Examples I and II are repeated employing n-nonadecanol, n-eicosanol, n-tetracosanol, n-pentacosanol, n-hexacosanol, n-octacosanol, n-triacontanol, and n-dotriacontanol, the following products are produced: nonadecyl maleamide, eicosyl maleamide, tetracosanyl maleamide, pentacosanyl maleamide, hexacosanyl maleamide, octacosanyl maleamide, triacontansyl maleamide, and dotriacontansyl maleamide.

The following table sets forth data which demonstrates the hardness of the half ester-half amides of the present invention as compared to other compositions. It is noted from the data set forth herein below that a half ester-half amide of this invention, monodocosanyl maleamide, has a hardness comparable to carnauba wax and is much harder than the commercially available montan wax.

Table

COMPARATIVE PENETROMETER TESTS

| Material tested: | Penetrometer reading [a] |
|---|---|
| Carnauba wax | 2 |
| Candelila wax | 4 |
| Stearic acid | 7 |
| Montan wax | 17.5 |
| Beeswax | 32 |
| Docosene-1 | [b] |
| The ammonium salt of monodocosanyl maleic acid | [b] |
| Monodocosanyl maleamide | 2 |

[a] Readings taken under standard conditions, i.e., for 5 seconds, at 25° C. and with a 100 g. weight according to ASTM test No. D1168–51T.
[b] Too soft to measure.

When comparative water emulsions are made of carnauba wax and an ester of this invention, monodocosanyl maleamide, it is noted that the wax half ester-half amides have excellent luster. These emulsions are prepared in accordance with the procedures described by H. Bennett in "Practical Emulsions," Chemical Publishing Company (1943), page 367, formula No. 7. This emulsion procedure comprises mixing 11.2 g. of the wax which is stirred and melted, with 2.4 g. of oleic acid and 2.2 g. of morpholine. Boiling water (67 g.) is added in portions to the rapidly stirring mixture. A second emulsion is prepared by adding boiling water, 15.5 g. to a stirring mixture of shellac (15.5 g.) and 0.2 g. of morpholine. These separate emulsions are then mixed and stirred together.

From the data above, it has been demonstrated that the novel half ester-half amides of the present invention, i.e., monodocosanyl maleamide have a hardness and gloss essentially equal to carnauba wax. These half ester-half amides which are comparable to the beneficial properties of the carnauba wax, combined with other advantageous features, e.g., no required costly purification, no costly handling, and no dependence upon weather conditions for a good agricultural crop, make these novel compounds of value to the wax industry.

While the novel half ester-half amides of this invention have been primarily discussed from the standpoint of using maleic acid, it should be noted that other aliphatic unsaturated dicarboxylic acids may be employed. Fumaric acid, the trans isomer of maleic acid, as well as acetylene dicarboxylic acid, may be used. Typical of other acids which may be used are the cis and trans form of 2-hexenedioic acid; the cis or trans forms of 3-octenedioic acid; 2-pentynedioic acid; 2-hexynedioic acids, and the like.

Similarly alcohols having greater than 36 carbon atoms may also be used to produce the half ester-half amides having the property of hardness. Typical of these alcohols are heptatriacontanol, octatriacontanol, nonatriacontanol, tetracontanol, hentetracontanol, dotetracontanol, tritetracontanol, tetratetracontanol, octatetracontanol, pentacontanol, pentapentacontanol, hexacontanol, and the like.

In producing the half ester the ratio of anhydride to the high molecular weight alcohol is essentially stoichiometric. When large excesses of alcohol are employed the unreacted alcohol is difficult to separate from the resultant half ester product. In some instances it is desirable to employ up to about a three-fold excess of acid. However, in other instances it is sometimes preferred to employ a slight excess of either reactant if one of the reactants is volatile at room temperatures.

The reaction time required in the process of producing the novel intermediate half ester generally ranges from about thirty minutes up to about six hours. The most preferred reaction time generally ranges from about one hour to about five hours since the half ester products obtained during this reaction time are in sufficient yields to make the process economical.

The temperature employed during the partial esterification process, as in other esterification procedures, generally ranges from about 90° C. up to about 300° C. The preferred temperature employed during the esterification process generally ranges from about 110° C. up to about 270° C.

The pressure employed during the esterification process generally can range from sub-atmospheric to greater than atmospheric. The pressures generally range from about 100 mm. up to about 2000 mm. of mercury. It is preferred, however, to employ pressure ranging from atmospheric, i.e., 760 mm., to slightly above atmospheric, i.e., about 900 mm., since this is a more economical procedure and esters having excellent properties are produced within this range.

It is generally preferred during the esterification process when the acid is used in lieu of the anhydride reactant to employ carbon dioxide by bubbling the gas through the reaction mass while it is being stirred. While not desiring to be bound by theoretical considerations, it is believed that the carbon dioxide acts as a combination of (1) an acid to catalyze the reaction and (2) as a "sweeping gas" to remove water formed during the esterification process. The amount of carbon dioxide employed will generally vary over a wide range. Generally it is preferred to introduce the carbon dioxide into the reaction mass during the heating and stirring process and the amounts will generally vary from 10 moles to about 1000 moles carbon dioxide.

As stated hereinbefore, acid esterification catalysts such as mineral acids may or may not be employed. Generally in the process of this invention it is preferred not to employ a mineral acid catalyst since excellent results are obtained employing carbon dioxide in the process. Furthermore, when carbon dioxide is employed in lieu of the acid catalysts no removal of the catalyst from the end product is required.

Solvents may be employed in the esterification process although it is not essential in producing the novel intermediate half esters. Generally at the temperatures employed, the alcohols used in esterifying the acids will melt and form the solvent system. However, when the solvents are employed, any solvent may be used which is inert to the reaction mass. Typical of these classes of solvents are the petroleum hydrocarbons, diethers, glycol ethers, cyclic ethers, aromatics, and the like. These classes include as solvents benzene, toluene, xylene, hexane, cyclohexane, diethyl ether, dibutyl ether, dimethyl ether of diethylene glycol, the diethyl ether of diethylene glycol, tetrahydrofuran, tetrahydropyran, gasoline, kerosene, naphthas, and the like.

After the intermediate half ester is produced the product is converted to the acid halide by reacting the half ester-half acid with a reactive halide such as phosphorus trichloride, phosphorus pentachloride, thionyl chloride, acetyl chloride, and the like. However, it should be understood that other halides, e.g., thionyl bromine can be used.

The amount of halide reactant employed generally ranges from about 2 moles up to about 10 moles of halide reactant per mole of half acid-half ester. It is preferred to employ from about 2 moles to about 6 moles of halide reactant per mole of half acid-half ester since excellent results are obtained when ratios within this range are employed.

The reaction time required in the process of producing the acid ester halide generally ranges from about 30 minutes up to about 4 hours. It is preferred, however, to permit the reaction to continue from about one hours to about two hours since generally within this time range the reaction is complete.

The temperature employed in the conversion to the ester acid halide generally ranges from about 30° C. up to about 100° C. The preferred temperature generally is a reflux temperature of the system since the halide reactants employed form their own solvent system and have boiling points within the 30° C. to 100° C. range. Thus, the preferred temperature ranges are from about 50° C. up to about 90° C.

The pressure employed in the conversion step ranges generally at about atmospheric pressure. However, pressures ranging from about 500 mm. of mercury up to about 1000 mm. of mercury can be used.

Most generally it is particularly preferred that no solvent be employed since the halide reactant used forms a solvent system in which the reaction takes place. However, when desired a solvent may be employed which is inert to the reactants present in the system. Typical of the solvents which may be used are those shown herein above for the partial esterification process.

In converting the ester acid halide to the desired amide product, the ester acid halide is reacted with large excesses of gaseous ammonia. Generally the amount of ammonia employed ranges from about 2 moles up to about 100 moles of ammonia per mole of acid. The most preferred amounts of ammonia range from about 3 moles up to about 25 moles per mole of acid since excellent results are obtained where quantitative yields are obtained within this range.

The pressure employed generally ranges from about atmospheric to superatmospheric pressures. In many instances it is desirable to pressure ammonia into the reaction system to obtain a faster reaction rate with a shorter reaction time. Thus the pressures generally range from about atmospheric up to about 10 atmospheres depending on the desired reaction time.

The temperature employed in the conversion of the ester acid chloride to the desired amide product is generally the reflux temperature of the system. Thus, reaction temperatures generally can vary from about room temperature up to about 150° C. The preferred temperature generally ranges from about 50° C. up to about 90° C. since the desired product is generally obtained in high yields when this range of temperatures is employed.

Solvents which are employed in converting the half ester acid halides are any solvents which are inert to the reactants present in the system. Thus many classes of solvents may be employed. Typical of these classes are petroleum hydrocarbons, glycol ethers, cyclic ethers, aromatics, and the like. These classes include such typical solvents as benzene, toluene, xylene, hexane, cyclohexane, the dimethyl ether of diethylene glycol, the diethyl ether of diethylene glycol, tetrahydrofuran, tetrahydropyran, gasoline, kerosene, naphthas and the like.

From the description of the novel products of this invention hereinbefore, it is seen that these compounds have utility as waxes. These half ester-half amides may be formulated as shown herein above to produce emulsions which may be used as floor polishes, furniture polishes, and the like.

Having thus described the embodiments of the present invention, it is not desired to be bound except as set forth in the following claims.

I claim:

1. An alkyl ester of maleamic acid; said alkyl group having from about 18 to about 36 carbon atoms.

2. The composition of claim 1 wherein said alkyl group contains from about 18 to about 26 carbon atoms.

3. Monodocosanyl maleamide.

No references cited.